United States Patent
Chou et al.

(10) Patent No.: US 9,013,610 B2
(45) Date of Patent: Apr. 21, 2015

(54) APPARATUS WITH CALIBRATED READOUT CIRCUIT

(71) Applicant: Taiwan Semiconductor Manufacturing Company, Ltd., Hsinchu (TW)

(72) Inventors: Po-Sheng Chou, Baoshan Township (TW); Calvin Yi-Ping Chao, Zhubei (TW); Kuo-Yu Chou, Hsinchu (TW); Honyih Tu, Hsinchu (TW); Yi-Che Chen, Taichung (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 14/457,521

(22) Filed: Aug. 12, 2014

(65) Prior Publication Data

US 2014/0347535 A1 Nov. 27, 2014

Related U.S. Application Data

(62) Division of application No. 13/445,350, filed on Apr. 12, 2012, now Pat. No. 8,830,361.

(51) Int. Cl.
| | |
|---|---|
| *H04N 5/217* | (2011.01) |
| *H04N 3/14* | (2006.01) |
| *H04N 5/335* | (2011.01) |
| *H03M 1/00* | (2006.01) |
| *H04N 5/378* | (2011.01) |
| *G01J 1/46* | (2006.01) |
| *H04N 5/365* | (2011.01) |
| *H04N 17/00* | (2006.01) |
| *H04N 5/3745* | (2011.01) |

(52) U.S. Cl.
CPC . *H04N 5/378* (2013.01); *G01J 1/46* (2013.01); *H04N 5/3658* (2013.01); *H04N 17/002* (2013.01); *H04N 5/37457* (2013.01)

(58) Field of Classification Search
USPC ................ 348/241–251, 294–324; 250/208.1
See application file for complete search history.

(56) References Cited

U.S. PATENT DOCUMENTS

| | | | |
|---|---|---|---|
| 5,047,861 A | 9/1991 | Houchin et al. | |
| 5,047,863 A | 9/1991 | Pape et al. | |
| 5,920,274 A | 7/1999 | Gowda et al. | |
| 6,867,804 B1 | 3/2005 | Kim et al. | |
| 6,965,407 B2 | 11/2005 | Boemler et al. | |
| 7,242,820 B2 | 7/2007 | Nam | |
| 7,414,552 B2 | 8/2008 | Chou | |
| 7,623,173 B2 | 11/2009 | Nitta et al. | |
| 8,072,522 B2 | 12/2011 | Taura | |
| 8,570,416 B2 | 10/2013 | Araki et al. | |
| 2002/0134918 A1 | 9/2002 | Miida | |

(Continued)

*Primary Examiner* — Michael Osinski
(74) *Attorney, Agent, or Firm* — Lowe Hauptman & Ham, LLP

(57) ABSTRACT

An apparatus comprises a readout circuit configured to be disconnected from a pixel output, and to connect a pixel reset signal received by the readout circuit to a pixel output signal received by the readout circuit. The apparatus also comprises at least one programmable gain amplifier coupled with the readout circuit. The apparatus further comprises an analog-to-digital converter coupled with the programmable gain amplifier. The readout circuit is configured to be calibrated based on a comparison of a measured output of the readout circuit to a predetermined value, the predetermined value being equal to $(2^n/2)-1$, where n is the number of bits of the analog-to-digital converter.

20 Claims, 2 Drawing Sheets

(56) References Cited

U.S. PATENT DOCUMENTS

| | | |
|---|---|---|
| 2003/0025817 A1 | 2/2003 | Yonemoto et al. |
| 2003/0189209 A2 | 10/2003 | Tay |
| 2004/0169555 A1 | 9/2004 | Confalonieri et al. |
| 2004/0222351 A1 | 11/2004 | Rossi |
| 2005/0040886 A1 | 2/2005 | Fujimoto |
| 2005/0068431 A1* | 3/2005 | Mori ............................ 348/241 |
| 2005/0151677 A1 | 7/2005 | Chou |
| 2005/0243194 A1 | 11/2005 | Xu |
| 2006/0208936 A1 | 9/2006 | Boemler |
| 2006/0262204 A1 | 11/2006 | Dosluoglu |
| 2006/0284750 A1* | 12/2006 | Keskin ........................ 341/120 |
| 2007/0076101 A1 | 4/2007 | Baer |
| 2007/0146519 A1 | 6/2007 | Iwasawa |
| 2007/0235631 A1 | 10/2007 | Ladd |
| 2008/0007439 A1* | 1/2008 | Hirose et al. ................. 341/120 |
| 2008/0012966 A1 | 1/2008 | Beck et al. |
| 2008/0055432 A1 | 3/2008 | Koseki |
| 2008/0094271 A1 | 4/2008 | Tooyama et al. |
| 2008/0111905 A1 | 5/2008 | Toyama et al. |
| 2008/0143855 A1 | 6/2008 | Hussey et al. |
| 2008/0169955 A1* | 7/2008 | Inada ............................ 341/156 |
| 2009/0190018 A1* | 7/2009 | Sakakibara ................... 348/308 |
| 2009/0213259 A1 | 8/2009 | Su et al. |
| 2009/0322911 A1 | 12/2009 | Blanquart |
| 2010/0039544 A1 | 2/2010 | Tejada et al. |
| 2010/0053379 A1 | 3/2010 | Willassen |
| 2010/0315540 A1* | 12/2010 | Hoshino ....................... 348/294 |
| 2011/0001039 A1 | 1/2011 | Hoshino |
| 2011/0317036 A1 | 12/2011 | Lim |
| 2012/0175500 A1* | 7/2012 | Saito .......................... 250/208.1 |
| 2013/0141263 A1* | 6/2013 | Debnath et al. ............... 341/120 |

* cited by examiner

APPARATUS WITH CALIBRATED READOUT CIRCUIT

PRIORITY CLAIM

The present application is a divisional of U.S. application Ser. No. 13/445,350, filed Apr. 12, 2012, which is incorporated herein by reference in its entirety.

BACKGROUND

Image capturing devices such as sensor pixel arrays convert incident light into electrical signals and use the electrical signals to reproduce an image. The quality of the reproduced image is determined in part by the precision of the pixels themselves and in part by the precision of readout circuitry coupled to the sensor pixel array. Column fixed pattern noise (CFPN) is a result of variations, i.e., mismatches, in the readout circuitry due to small variations during manufacturing, temperature of the circuitry or operating time. Some of the parameters which impact CFPN include offset voltage, feedback capacitance value, transistor threshold voltage, overlap capacitance value and bias current variations. As the CFPN increases, the quality of the reproduced image decreases.

CFPN problems are separate from any degradation which occurs based on imprecision within the pixels themselves. Conventional techniques attempt to correct image degradation by using the combined effect of CFPN and pixel imprecision. However, when the intensity of incident light is low, image degradation issues with respect to CFPN are often more significant than image degradation introduced by the pixels. Conventional techniques fail to account for the relative increase in CFPN induced degradation at low light levels.

Readout circuitry is often electrically connected to gain amplifiers in order to boost signals output by the sensor pixel array to provide higher contrast in the reproduced image. As the gain amplifiers increase the strength of the signals output by the sensor pixel array, the impact of CFPN is also increased. Conventional techniques fail to account for the different amounts of CFPN introduced at different gain conditions.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are of course, merely examples and are not intended to be limiting.

Figure 1A:
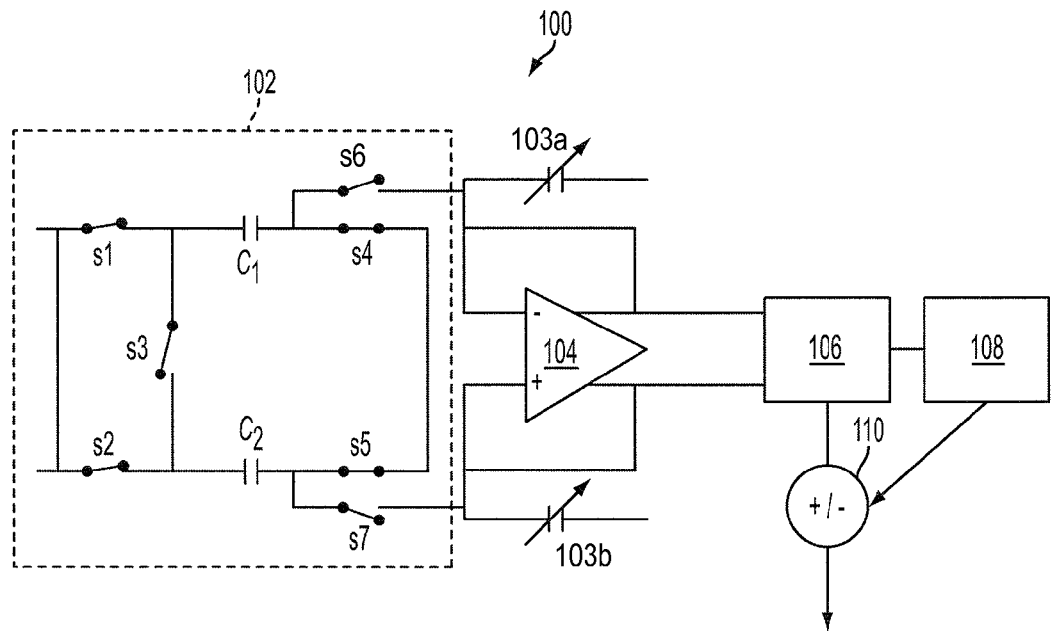
FIG. 1A is a schematic diagram of a readout device in a calibration mode according to one or more embodiments.

FIG. 1A is a schematic diagram of a readout device 100 in a calibration mode including a readout circuit 102. Outputs of readout circuit 102 are electrically connected to a programmable gain amplifier (PGA) 104. First and second outputs of PGA 104 are electrically connected to an analog-to-digital converter (ADC) 106. ADC 106 is electrically connected to a memory device 108 and to a signal combiner 110. Memory device 108 is also electrically connected to signal combiner 110.

Readout circuit 102 includes a first switch S1 configured to receive a pixel reset signal. Readout circuit 102 further includes a second switch S2 configured to receive a pixel output signal. First switch S1 is electrically connected to a first capacitor C1 and a first side of a third switch S3. Second switch S2 is electrically connected to a second capacitor C2 and a second side of third switch S3. First capacitor C1 is also electrically connected to a fourth switch S4. Second capacitor C2 is also electrically connected to a fifth switch S5. A sixth switch S6 is electrically connected to first capacitor C1. Sixth switch S6 is configured to output a first readout output to a first variable capacitor 103a and then to a first input of PGA 104. A seventh switch S7 is electrically connected to second capacitor C2. Seventh switch S7 is configured to output a second readout output to a second variable capacitor 103b and then to a second input of PGA 104.

In some embodiments, switches S1-S7 comprise transistors such as metal oxide semiconductor (MOS) transistors, MOS field effect transistors (MOSFETs), bipolar junction transistors (BJTs), insulated gate bipolar transistors (IGBTs), or other suitable transistors. In some embodiments, switches S1-S7 comprise thyristors, such as gate turn-off thyristors (GTOs), silicon controlled rectifiers (SCRs), MOS controlled thyristors (MCTs), or other suitable thyristors.

Each of switches S1-S7 introduces mismatches between an expected power transfer and an actual power transfer. The mismatches in turn create column fixed pattern noise, which reduces the quality of the signal passing through readout circuit 102.

First and second variable capacitors 103a and 103b have a tunable capacitance. In some embodiments, first and second variable capacitors 103a and 103b are mechanically controlled. In some embodiments, first and second variable capacitors 103a and 103b are electronically controlled. In some embodiments, first and second variable capacitors 103a and 103b are controlled by a same controller. In some embodiments, first and second variable capacitors 103a and 103b are controlled by different controllers. In some embodiments, first and second variable capacitors 103a and 103b are controlled to have the same capacitance. In some embodiments, first and second variable capacitors 103a and 103b are controlled to have different capacitances.

PGA 104 is an electronic amplifier whose gain is able to be controlled by an external controller. In some embodiments, the ratio between an amplitude of an input signal and an amplitude of an output signal for PGA 104 ranges from 1:1 to 1:8. In some embodiments, a maximum ratio between the amplitude of the input signal and the amplitude of the output signal for PGA 104 is greater than 1:8.

ADC 106 receives an analog input signal and outputs a digital signal proportional to a magnitude of the analog input signal. In some embodiments, ADC 106 is a direct conversion ADC. In some embodiments, ADC 106 is a different type of ADC such as a success approximation ADC, a ramp-compare ADC, a Wilkinson ADC, an integrating ADC or other suitable ADC.

During calibration, memory device 108 stores calibration information related to mismatches associated with each switch S1-S7. In some embodiments, memory device 108 comprises a random access memory (RAM). In some embodiments, memory device 108 comprises a static RAM, a dynamic RAM or other suitable information storage devices.

Figure 1B:
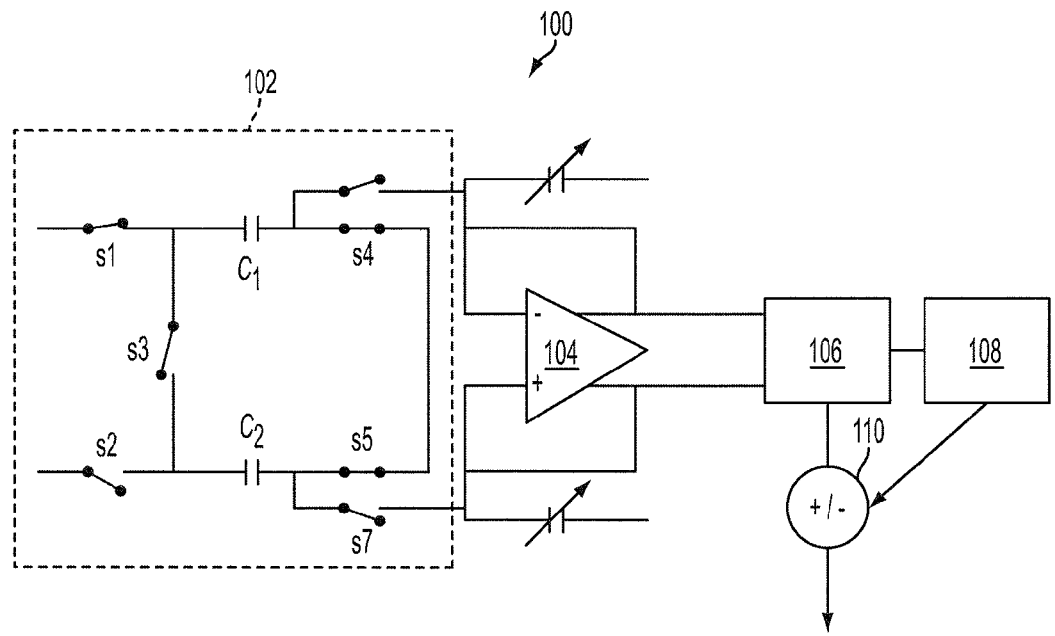
FIG. 1B is a schematic diagram of a readout device in a normal operation mode according to one or more embodiments.

FIG. 1B is a schematic diagram of readout circuit 100 in a normal operation mode. The components of readout circuit 100 are the same in calibration mode and normal operation mode. During normal operation, signal combiner 110 combines the calibration information stored in memory device 108 with an output of ADC 106 to provide an output signal having reduced noise. When the calibration information indicates readout circuit 102 produces a signal above the expected signal, signal combiner 110 subtracts the calibration information stored in memory device 108 from the pixel output signal. When the calibration information indicates readout circuit 102 produces a signal below the expected signal, signal combiner 110 adds the calibration information stored in memory device 108 to the pixel output signal. Signal combiner 110 comprises a processor capable of performing calculations.

Readout device 100 is part of a sensor pixel array. During normal operation of the sensor pixel array, the output of signal combiner 110 is received by a display viewable by a user. In some embodiments, each column of the sensor pixel array is independently connected to a separate readout circuit 102. In some embodiments, a number of readout circuits 102 electrically connected to the sensor pixel array is greater than 1,000. In some embodiments, PGA 104, ADC 106, memory device 108 and signal combiner 110 are shared by all readout circuits 102 in the sensor pixel array.

During calibration, readout circuit 102 is disconnected from the sensor pixel array. In some embodiments, readout circuit 102 is disconnected from the sensor pixel array by opening a switch. In some embodiments, one readout circuit 102 is disconnected from the sensor pixel array for calibration, while other readout circuits 102 continue normal operation. In some embodiments where one readout circuit 102 is disconnected from the sensor pixel array during calibration, the readout circuit 102 which is disconnected cycles through each of the readout circuits 102 in turn. In some embodiments, all readout circuits 102 are disconnected from the sensor pixel array during calibration.

Also during calibration, as depicted in FIG. 1A, switches S1, S2, S4 and S5 are closed and the inputs of switches S1 and S2 are connected. In some embodiments, the inputs of switch S1 and switch S2 are electrically connected by closing a switch.

In some embodiments, readout circuit 102 includes a temperature sensing element. In some embodiments, calibration is initiated based a temperature detected by the temperature sensing element. In some embodiments, the temperature sensing element is a thermocouple or other suitable temperature detecting device. In some embodiments, if the temperature voltage exceeds an activation voltage of switches S1-S7, a calibration signal is transmitted to readout circuit 102.

In some embodiments, readout circuit 102 receives a calibration signal to initiate calibration. In some embodiments, the calibration signal is sent by a manual input based on an action by the operator commanding the readout circuit 102 perform calibration. In some embodiments, the manual input is received by an operator pressing a button or other suitable actions. In some embodiments, the calibration signal is sent by a controller based on an operating time of the readout circuit 102. In some embodiments, the operating time between each calibration is selected by the operator. In some embodiments, the operating time between each calibration is predetermined.

Figure 2:
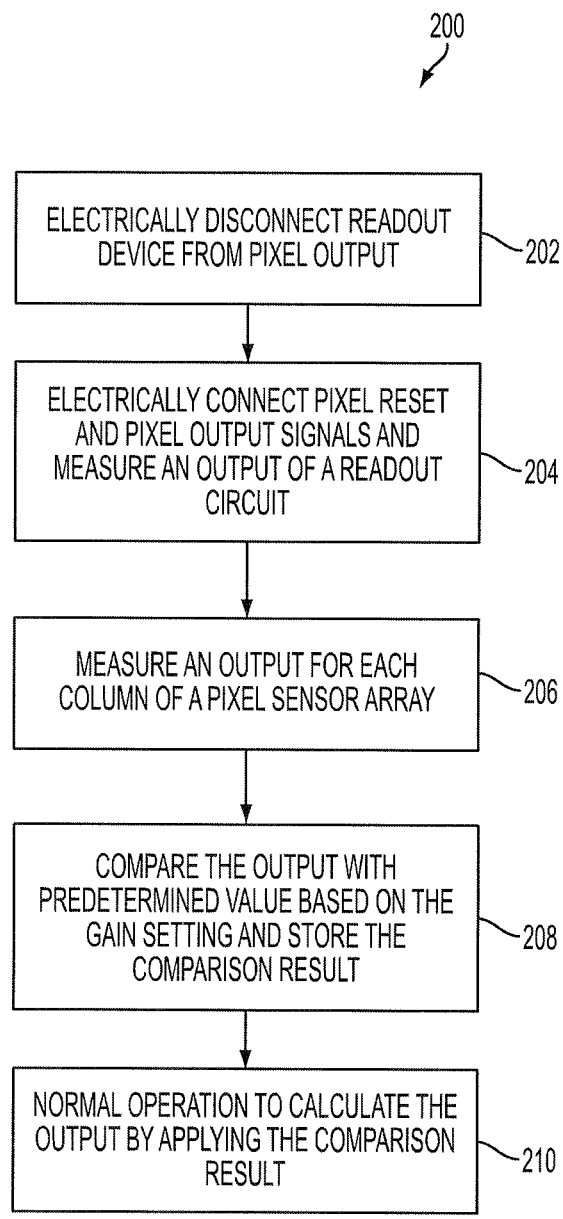
FIG. 2 is a flowchart of a method of reducing column fixed pattern noise according to one or more embodiments.

FIG. 2 is a flowchart of a method 200 of reducing column fixed pattern noise (CFPN). In operation 202, readout device 100 is electrically disconnected from a pixel output. In some embodiments, readout device 100 is electrically disconnected from the pixel output using at least one switch disposed between the pixel and readout device 100. Disconnecting readout device 100 from the pixel output prevents erroneous data from being sent to memory device 108 during calibration of readout device 100.

The pixel reset signal input is electrically connected to the pixel output signal and an output of readout circuit 102 is measured in operation 204. In some embodiments, a switch between the pixel reset signal and the pixel output signal on an upstream side of switches Si and S2 is closed to electrically connect the pixel reset signal input and the pixel output signal input. In some embodiments, the upstream side of switches S1 and S2 are tied to a preset voltage.

The output of readout circuit 102 is generated by a charging phase and a readout phase. During the charging phase, switches S1, S2, S4 and S5 are closed to charge first capacitor C1 and second capacitor C2. Switches S3, S6 and S7 are open. By having switches S3, S6 and S7 open, a voltage is held between switches S4 and S5 of readout circuit 102. The voltage held between switches S4 and S5 contacts a second side of first capacitor C1 and a second side of second capacitor C2.

During the readout phase, one switch of S3, S6 and S7 of readout circuit 102 is closed and the output of readout circuit 102 is measured. In some embodiments, the output of readout circuit 102 is measured at the output of PGA 104. In some embodiments, the output of readout circuit 102 is measured at a first output and a second output of PGA 104. In some embodiments, the output of readout circuit 102 is measured at the output of ADC 106.

After measuring the output of readout circuit 102, the charging phase and the readout phase are repeated for each of the open switches, e.g., switches S3, S6 and S7. In some embodiments, readout circuit 102 includes additional open switches and the charging and readout procedures are repeated for each open switch of readout circuit 102.

In optional operation 206, operations 202 and 204 are repeated for each readout circuit in a pixel sensor array. In some embodiments, the pixel sensor array includes more than one readout device. In some embodiments, the pixel sensor array includes one readout device electrically connected to each column of the pixel sensor array. By measuring an output for each readout device of the pixel sensor array individually, the calibration process accounts for mismatches specific to each readout device. Memory device 108 stores output corresponding to each readout device.

In operation 208, the output of readout circuit 102 is compared with the predetermined value based on the gain setting and the comparison result is stored. In some embodiments, the predetermined value is selected based on the number of bits available in readout circuit 102. In some embodiments, the predetermined value is equal to $(2^n/2)-1$, where n is the number of bits of ADC 106. As the number of bits in ADC 106 increases, a resolution of a reproduced image increases.

The comparison result is stored in memory device 108. When the output of readout circuit 102 is greater than the predetermined value, the calibration information stored in memory device 108 is the predetermined value subtracted from the output of readout circuit 102. When the output of readout circuit 102 is less than the predetermined value, the calibration information stored in memory device 108 is the output of readout circuit 102 subtracted from the predetermined value. When the output of readout circuit 102 equals the predetermined value, the calibration information stored in memory device 108 is zero.

CFPN changes based on the gain setting value of PGA 104. In some embodiments, during calibration of readout device 100, PGA 104 cycles through every gain setting value of PGA 104. In some embodiments, during calibration of readout device 100, PGA 104 cycles through less than every gain setting value of PGA 104. Memory device 108 stores the comparison result based on the gain setting value of PGA 104, to obtain a comprehensive calibration of readout circuit 102 to reduce CFPN.

In operation 210, during normal operation an output of readout device 100 is calculated by applying a corresponding comparison result to the output of readout circuit 102. During normal operation, as depicted in FIG. 1B, switch S1 is closed to reset the output of readout circuit 102. Once the output is reset, switch S1 is opened and switch S2 is closed to receive the pixel sample signal. Switches S4 and S5 remain closed during normal operation. Switches S3, S6 and S7 are closed one by one and the output of readout circuit 102 is transmitted through PGA 104 and ADC 106 to signal combiner 110. Signal combiner 110 receives signals from ADC 106 as well as corresponding store comparison results from memory device 108 and combines the signals to produce a calibrated output. The calibrated output has an increased precision as a result of the reduced CFPN achieved through calibration of readout circuit 102 for each column of the sensor pixel array.

By using method 200, image resolution at low intensity levels of incident light is increased versus conventional methods. Conventional methods fail to independently account for CFPN in calibrating the sensor pixel array. At low intensity levels of incident light CFPN is the most significant factor in image degradation. Method 200 independently calibrates readout circuits attached to the sensor pixel array and therefore is capable of reproducing a higher quality image at low intensity levels as compared to conventional calibration techniques.

Method 200 also provides calibration information associated with each gain of the programmable gain amplifier. Conventional methods fail to account for the impact of gain on CFPN. By providing calibration information for each switch in readout circuits attached to the sensor pixel array at different gains, method 200 is capable of maintaining a consistent image quality that does not fluctuate as the gain changes.

While the above description of method 200 applies the method to readout circuit 102, readout circuit 102 is used as an example to simplify description. One of ordinary skill will recognize method 200 is applicable to circuit designs other than readout circuit 102.

An aspect of this description relates to an apparatus that comprises a readout circuit configured to be disconnected from a pixel output, and to connect a pixel reset signal received by the readout circuit to a pixel output signal received by the readout circuit. The apparatus also comprises at least one programmable gain amplifier coupled with the readout circuit. The apparatus further comprises an analog-to-digital converter coupled with the programmable gain amplifier. The readout circuit is configured to be calibrated based on a comparison of a measured output of the readout circuit to a predetermined value, the predetermined value being equal to $(2n/2)-1$, where n is the number of bits of the analog-to-digital converter.

Another aspect of this description relates to a sensor pixel array that comprises at least one column having a readout circuit. The sensor pixel array also comprises at least one programmable gain amplifier. The sensor pixel array further comprises an analog-to-digital converter, and each of the at least one column comprises a readout circuit. The readout circuit is configured to be calibrated based on a comparison of a measured output of the readout circuit to a predetermined value, the predetermined value being equal to $(2n/2)-1$, where n is the number of bits of the analog-to-digital converter.

A further aspect of this description relates to a readout device that comprises a readout circuit. The readout circuit comprises a first switch configured to receive a pixel reset signal; a second switch configured to receive a pixel output signal; a third switch configured to electrically connect an output of the first switch to an output of the second switch; and a first capacitor. A first side of the first capacitor is configured to electrically connect to the output of the first switch. The readout circuit also comprises a second capacitor. A first side of the second capacitor is configured to electrically connect to the output of the second switch. The readout circuit further comprises a fourth switch configured to electrically connect to a second side of the first capacitor; and a fifth switch configured to electrically connect to a second side of the second capacitor. An output of the fifth switch is connected to an output of the fourth switch. The readout circuit additionally comprises a sixth switch configured to electrically connect to the second side of the first capacitor. The sixth switch is configured to provide a first output of the readout circuit. The readout circuit also comprises a seventh switch configured to electrically connect to the second side of the second capacitor. The seventh switch is configured to provide a second output of the readout circuit.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An apparatus comprising:
  a readout circuit configured to be disconnected from a pixel output, and to connect a pixel reset signal received by the readout circuit to a pixel output signal received by the readout circuit;
  at least one programmable gain amplifier coupled with the readout circuit; and
  an analog-to-digital converter coupled with the programmable gain amplifier,
  wherein the readout circuit is configured to be calibrated based on a comparison of a measured output of the readout circuit to a predetermined value, the predetermined value being equal to $(2^n/2)-1$, where n is the number of bits of the analog-to-digital converter.

2. The apparatus of claim 1, wherein the comparison of the output of the readout circuit is a comparison of a measurement of a first signal at a first output of the at least one programmable gain amplifier with a measurement of a second signal at a second output of the at least one programmable gain amplifier.

3. The apparatus of claim 1, wherein the readout circuit is further configured to be calibrated based on a change in a gain level of the at least one programmable gain amplifier to a different gain level.

4. The apparatus of claim 1, wherein readout circuit is configured to connect the pixel reset signal to the pixel output signal comprises by connecting the pixel reset signal to the pixel output signal upstream from the readout circuit.

5. The apparatus of claim 1, wherein the comparison of the output of the readout circuit is based on a measured digital output of the analog-to-digital converter.

6. The apparatus of claim 1, further comprising:
a signal combiner coupled with the analog-to-digital converter, the signal combiner configured to combine an operation output of the readout circuit and data stored in a memory, and to output a calibrated output based on the combination.

7. A sensor pixel array, comprising:
at least one column having a readout circuit;
at least one programmable gain amplifier; and
an analog-to-digital converter, and each of the at least one column comprises a readout circuit,
wherein the readout circuit is configured to be calibrated based on a comparison of a measured output of the readout circuit to a predetermined value, the predetermined value being equal to $(2^n/2)-1$, where n is the number of bits of the analog-to-digital converter.

8. The sensor pixel array of claim 7, wherein the comparison of the output of the readout circuit is a comparison of a measurement of a first signal at a first output of the at least one programmable gain amplifier with a measurement of a second signal at a second output of the at least one programmable gain amplifier.

9. The sensor pixel array of claim 7, wherein the readout circuit is further configured to be calibrated based on a change in a gain level of the at least one programmable gain amplifier to a different gain level.

10. The sensor pixel array of claim 7, wherein readout circuit is configured to connect the pixel reset signal to the pixel output signal comprises by connecting the pixel reset signal to the pixel output signal upstream from the readout circuit.

11. The sensor pixel array of claim 7, wherein the comparison of the output of the readout circuit is based on a measured digital output of the analog-to-digital converter.

12. The sensor pixel array of claim 7, further comprising:
a signal combiner coupled with the analog-to-digital converter, the signal combiner being configured to combine an operation output of the readout circuit and data stored in a memory, and to output a calibrated output based on the combination.

13. The sensor pixel array of claim 7, wherein the readout circuit of the at least one column is configured to be calibrated while one or more other readout circuits of one or more other columns are configured to continue operating during the calibration of the readout circuit of the at least one column.

14. An apparatus comprising:
a readout circuit configured to be disconnected from a pixel output, and to connect a pixel reset signal received by the readout circuit to a pixel output signal received by the readout circuit;
at least one programmable gain amplifier coupled with the readout circuit;
an analog-to-digital converter coupled with the programmable gain amplifier; and
a memory,
wherein the readout circuit is configured to be calibrated based on a comparison of a measured output of the readout circuit to a predetermined value, the predetermined value being equal to $(2^n/2)-1$, where n is the number of bits of the analog-to-digital converter, and calibration information based on the result of the comparison is stored in the memory.

15. The apparatus of claim 14, wherein the comparison of the output of the readout circuit is a comparison of a measurement of a first signal at a first output of the at least one programmable gain amplifier with a measurement of a second signal at a second output of the at least one programmable gain amplifier.

16. The apparatus of claim 14, wherein the readout circuit is further configured to be calibrated based on a change in a gain level of the at least one programmable gain amplifier to a different gain level.

17. The apparatus of claim 14, wherein readout circuit is configured to connect the pixel reset signal to the pixel output signal comprises by connecting the pixel reset signal to the pixel output signal upstream from the readout circuit.

18. The apparatus of claim 14, wherein the comparison of the output of the readout circuit is based on a measured digital output of the analog-to-digital converter.

19. The apparatus of claim 14, further comprising:
a signal combiner coupled with the analog-to-digital converter, the signal combiner being configured to combine an operation output of the readout circuit and the calibration information stored in the memory, and to output a calibrated output based on the combination.

20. The apparatus of claim 14, wherein if the output of readout circuit is greater than the predetermined value, then the calibration information stored in memory is equal to the predetermined value subtracted from the output of readout circuit, if the output of readout circuit is less than the predetermined value, then the calibration information stored in memory is equal to the output of readout circuit subtracted from the predetermined value, and if the output of readout circuit equals the predetermined value, then the calibration information stored in memory device is equal to zero.

* * * * *